(12) United States Patent
Smith et al.

(10) Patent No.: US 10,888,942 B2
(45) Date of Patent: *Jan. 12, 2021

(54) APPARATUS AND METHOD FOR BRAZING (71) Applicant: Lincoln Global, Inc., Santa Fe Springs, CA (US)

(72) Inventors: Loren C. Smith, Gainesville, GA (US); Douglas S. Perry, Flowery Branch, GA (US); William Hopper, Gainesville, GA (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/893,738

(22) Filed: Feb. 12, 2018

(65) Prior Publication Data
US 2018/0161906 A1 Jun. 14, 2018

Related U.S. Application Data (60) Division of application No. 15/160,943, filed on May 20, 2016, now Pat. No. 10,058,946, which is a continuation of application No. 14/037,186, filed on Sep. 25, 2013, now Pat. No. 9,370,839.

(51) Int. Cl.
| | |
|---|---|
| *B23K 3/08* | (2006.01) |
| *B23K 1/008* | (2006.01) |
| *G05D 11/13* | (2006.01) |
| *B23K 3/02* | (2006.01) |
| *B23K 37/00* | (2006.01) |

(52) U.S. Cl.
CPC .............. *B23K 3/08* (2013.01); *B23K 1/008* (2013.01); *B23K 3/022* (2013.01); *B23K 37/006* (2013.01); *G05D 11/132* (2013.01); *Y10T 137/2703* (2015.04)

(58) Field of Classification Search
None
See application file for complete search history.

(56) References Cited

U.S. PATENT DOCUMENTS

| | | | |
|---|---|---|---|
| 2,762,427 A | 9/1956 | Tierney, Jr. | |
| 2,914,642 A | 11/1959 | Porter et al. | |
| 3,246,849 A | 4/1966 | Aske | |
| 3,905,394 A | 9/1975 | Jerde | |
| 4,277,254 A | 7/1981 | Hanson | |
| 4,568,277 A | 2/1986 | MacInnes et al. | |
| 4,605,034 A | 8/1986 | Urushida | |
| 4,776,366 A | 10/1988 | Czerwinski et al. | |
| 4,838,295 A | 6/1989 | Smith et al. | |

(Continued)

FOREIGN PATENT DOCUMENTS

| | | |
|---|---|---|
| EP | 0 188 763 A2 | 7/1986 |
| GB | 1 245 274 A | 9/1971 |

(Continued)

OTHER PUBLICATIONS

Extended European Search Report from Corresponding Application No. 18208918.5; dated May 14, 2019; pp. 1-9.

(Continued)

*Primary Examiner* — Devang R Patel
(74) *Attorney, Agent, or Firm* — David J. Muzilla (57) ABSTRACT

A brazing system has a first gas source, a second gas source, an enclosure, a brazing torch, and a control system configured to control a ratio of the first gas source and the second gas source.

20 Claims, 7 Drawing Sheets

(56) References Cited

U.S. PATENT DOCUMENTS

| | | | |
|---|---|---|---|
| 4,930,550 A | 6/1990 | Czerwinski et al. |
| 5,125,555 A | 6/1992 | Grisoni et al. |
| 5,779,466 A | 7/1998 | Okamura |
| 6,479,793 B1 | 11/2002 | Wittmann et al. |
| 6,693,263 B2 | 2/2004 | Nishimura |
| 6,708,719 B2 | 3/2004 | Idoguchi |
| 8,444,041 B2 | 5/2013 | Perry |
| 2003/0213520 A1 | 11/2003 | Prinz et al. |
| 2006/0212233 A1 | 9/2006 | Wong et al. |
| 2007/0056942 A1 | 3/2007 | Daniel et al. |
| 2009/0242037 A1 | 10/2009 | Drescher |
| 2010/0051595 A1 | 3/2010 | Diedrick et al. |
| 2012/0255988 A1 | 10/2012 | Perry |
| 2014/0076873 A1 | 3/2014 | Wilder et al. |
| 2015/0069029 A1 | 3/2015 | Daniel |

FOREIGN PATENT DOCUMENTS

| | | |
|---|---|---|
| GB | 1 537 013 A | 12/1978 |
| JP | 09-308960 A | 12/1997 |
| JP | H11 90623 A | 4/1999 |
| JP | 2001-138045 A | 5/2001 |
| JP | 2006-154857 A | 6/2006 |
| JP | 2010-184247 A | 8/2010 |
| KR | 1999-0064412 A | 8/1999 |
| KR | 10-0303244 B1 | 7/2001 |
| WO | 2012/137049 A1 | 10/2012 |
| WO | 2015/044727 A2 | 4/2015 |

OTHER PUBLICATIONS

Smith Equipment Interactive Catalog; www.smithequipment.com/products/smithcatalog2010.pdf; Jan. 16, 2011; pp. 1-77.

Roberts, Philp; "Industrial Brazing Practice"; CRC Press; 2004; Chap. 4; pp. 1-19.

Totten, George; "Steel Heat Treatment"; 2006; Chap. 8; p. 501.

American Welding Society; "Standard Welding Terms and Definitions"; An American National Standard; 12th Edition; Dated Jul. 1, 2009; pp. 1-162.

APPARATUS AND METHOD FOR BRAZING

CROSS REFERENCE TO RELATED APPLICATIONS/INCORPORATION BY REFERENCE

This U.S. Patent Application is a division of U.S. patent application Ser. No. 15/160,943 filed on May 20, 2016, which is incorporated herein by reference in its entirety, and which is a continuation of U.S. patent application Ser. No. 14/037,186 filed on Sep. 25, 2013 (now U.S. Pat. No. 9,370,839), which is also incorporated herein by reference in its entirety. U.S. Pat. No. 8,444,041, which was issued on May 21, 2013 based on an application filed on Apr. 8, 2011, is incorporated herein by reference in its entirety.

TECHNICAL FIELD

The invention described herein relates generally to a brazing system with reproducible gas flow rate control using a plurality of gases and method for achieving the same.

BACKGROUND OF THE DISCLOSURE

Brazing is one of the known method of joining metal members together with a brazing filler, i.e., a metal or alloy having a lower melting point than the metals to be joined. Brazing typically involves the use of a torch having at least two needle metering valves that control the flow and ratio of at least two welding gases. One of the gases will include a flammable fuel gas such as LP gas, natural gas, acetylene gas, methane, propane, butane, hydrogen and mixtures and combinations thereof, while the other gas will include a combustion-assisting gas such as oxygen or air. Needle metering valves are used to manually adjust the flow of the gases before and during brazing because the pressure, flow rate, and/or quality of the gases can vary and, in some cases, lead to quality issues. Adjustment is needed due to a variety of reasons, including changes in external temperature, the total amount of gas used, or the amount of gas remaining in a cylinder, all variables which affect gas flow rates. In addition, a torch operator, even an operator with many years of experience, can have a very difficult time setting the needle valves and determining if the gas mixture creates a flame having an acceptable oxygen to fuel ratio.

In view of the foregoing problems and shortcomings of existing brazing systems with torches having a plurality of adjustment valves, the present application describes a brazing system and method to overcome these shortcomings.

SUMMARY OF THE DISCLOSURE

In accordance with the present invention, there is provided a system including at least two separate gases, a single enclosure for each gas source, a brazing torch, and a means for determining a gas ratio between the at least two gases where the means is separate from the brazing torch. The single enclosure having at least two inlets (one for each gas) and two outlets (one for each gas), two pressure regulator valves (one for each gas), and two micrometer valves (one for each gas). The enclosure does not utilize any other flow regulation components, aside from tubing and manifolds to deliver and exit the respective gases. The enclosure may include vents to allow for proper ventilation of gases. The brazing torch includes an operating trigger but does not include control valves. The system also includes a means for determining a gas ratio between the at least two gases.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE DRAWINGS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
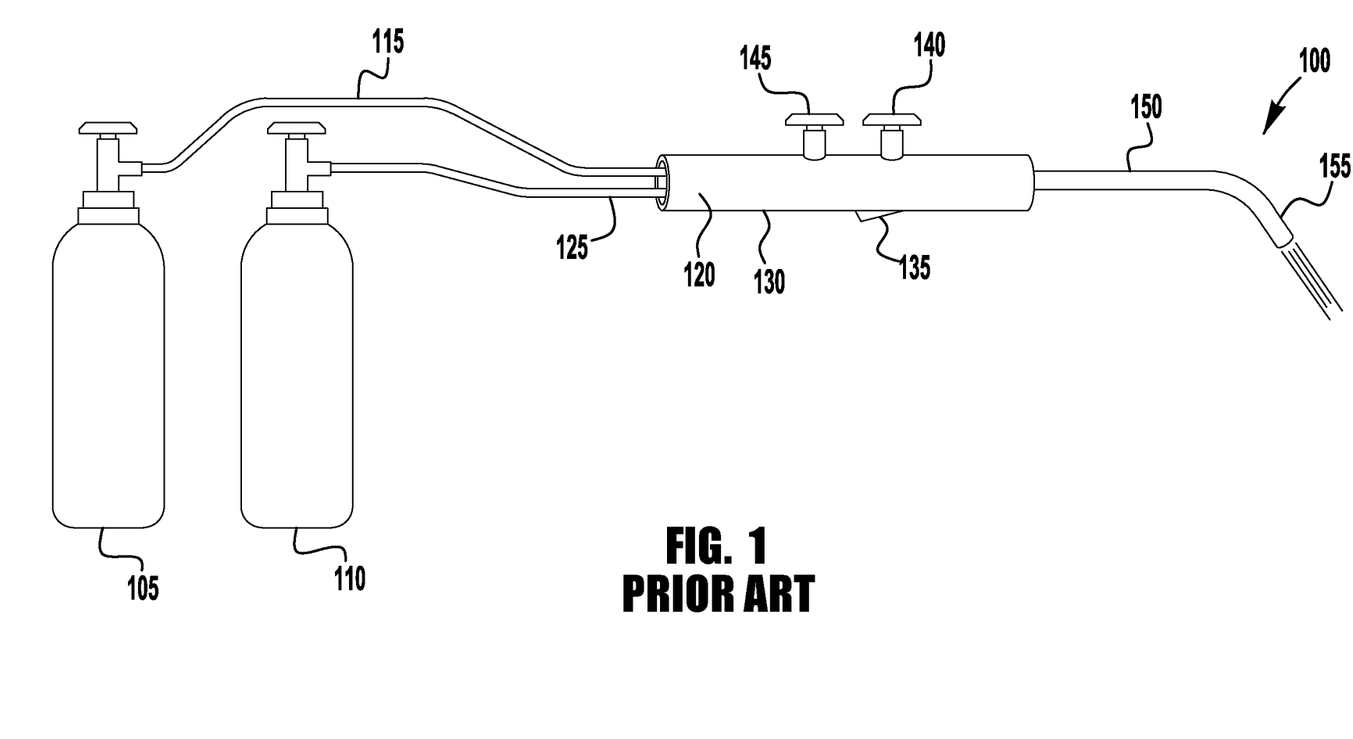
FIG. 1 is a side elevational view of a brazing system in which flow control is achieved using metering valves positioned on the torch.

FIG. 1 illustrates a brazing system 100 in which metering valves are positioned on the torch, and includes first gas source 105 and second gas source 110, wherein first gas source 105 is oxygen or air and second gas source 110 is a fuel, including at least one of the following: acetylene, propane, natural gas or methane, propylene, hydrogen, and butane or blends thereof. First gas hose 115 connects to first gas source 105 and to brazing torch 120, and second gas hose 125 connects to second gas source 110 and to brazing torch 120.

In the illustrated embodiment, brazing torch 120 includes handle or torch body 130, on/off switch 135, first needle valve 140, second needle valve 145, brazing torch neck 150, and brazing tip 155. To use conventional brazing system 100, an operator opens valves on first gas source 105 and second gas source 110, opens first needle valve 140 and second needle valve 145 to form a flammable gas mixture, and ignites the gas mixture exiting brazing tip 155. It is understood that the gas sources can be from gas tanks that have pressure regulators or from main supply lines that have pressure regulators. After ignition, the brazing torch operator will make adjustments to first needle valve 140 and second needle valve 145 to react to real or perceived inconsistencies in the brazing flame. Further, needle valve settings may be changed due to inconsistencies in the brazing joint caused by fluctuations in gas pressure and flow rates and inaccurate gas mixtures. As discussed above, even very experienced torch operators have difficulty setting flames with consistent oxygen to fuel ratios.

For example, operators can have difficulty accurately determining whether or not a brazing flame from the torch is neutral, or has the desired flame temperature or BTU output. Furthermore, operators have great difficulty in creating a consistent and repeatable flame, with the same flame characteristics.

Figure 2A:
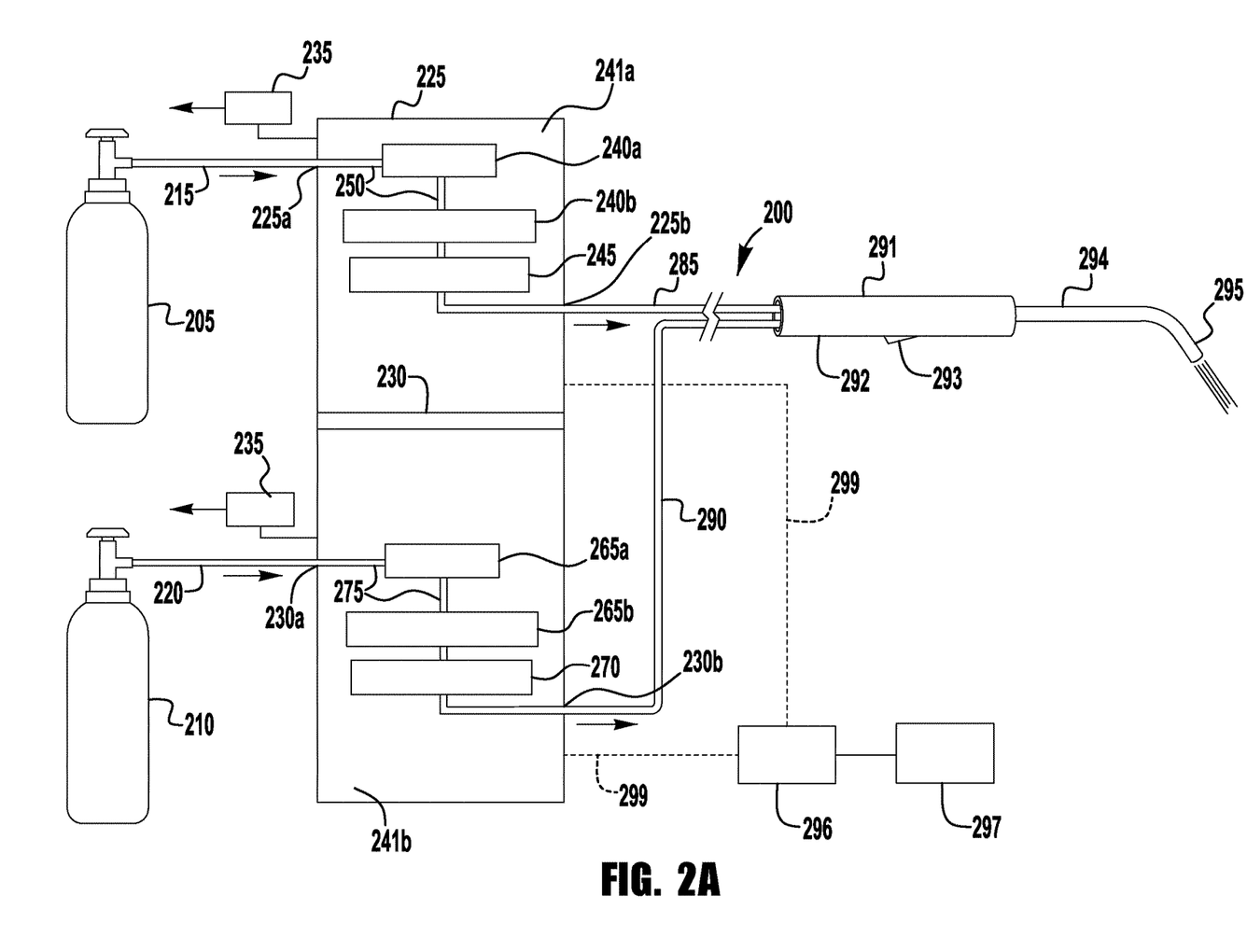
FIG. 2A is a schematic of a brazing system in accordance with an exemplary embodiment of the present invention.
Figure 2B:
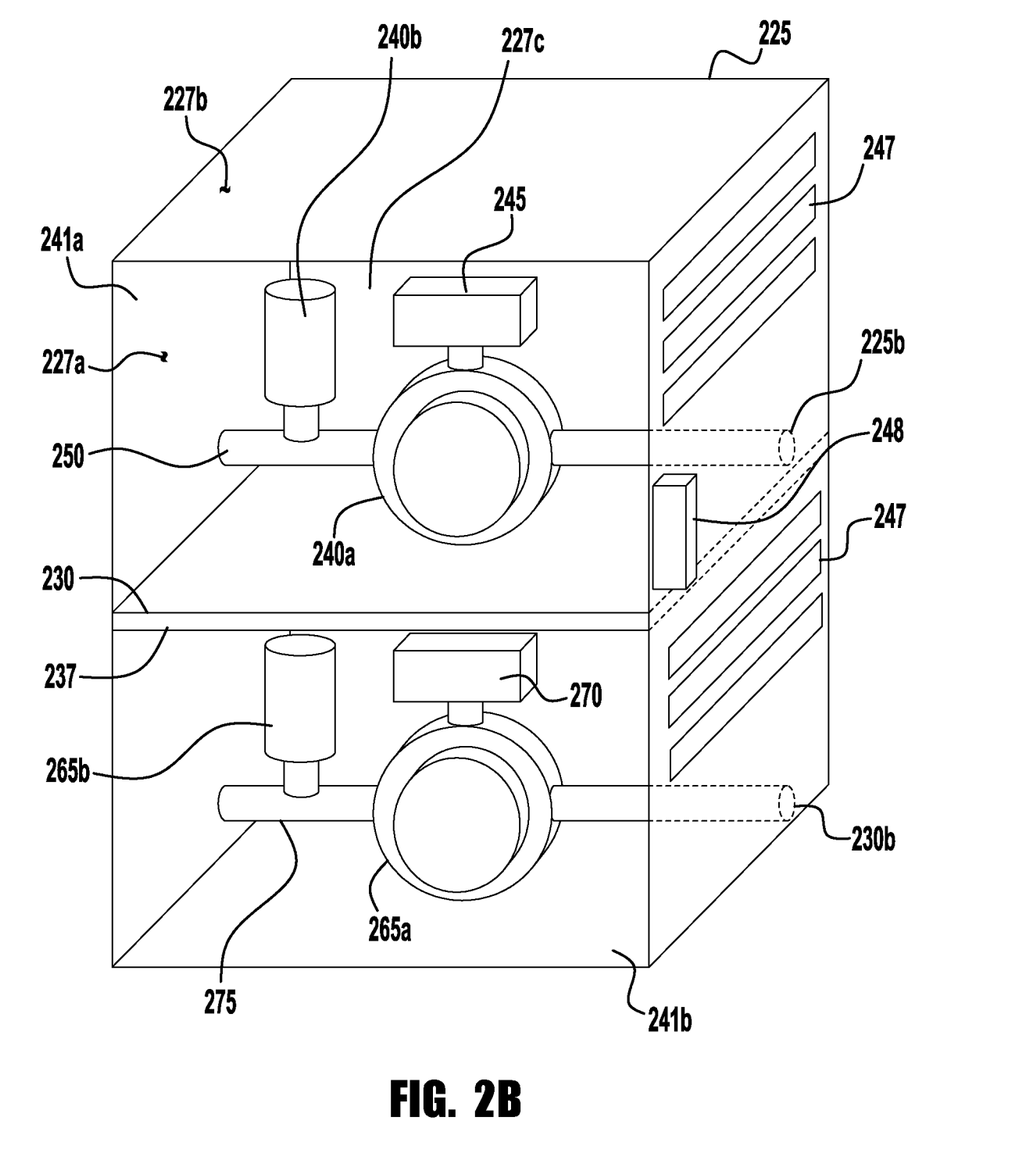
FIG. 2B is an illustrative diagram of an exemplary enclosure used with embodiments of the present invention.

FIG. 2A illustrates brazing system 200 in accordance with an exemplary embodiment of the present invention. The system 200 produces a brazing flame having a consistent oxygen to fuel ratio, BTU output and flame temperature every time the operator ignites the brazing torch 291. Brazing system 200 includes first gas source 205 and second gas source 210, wherein first gas source 205 is oxygen or air and second gas source 210 is a fuel, including at least one of the following: acetylene, propane, natural gas or methane, propylene, hydrogen, and butane or blends thereof. As mentioned above, it is understood that the gas sources can be from gas tanks that have pressure regulators or from main supply lines that have pressure regulators. First gas hose 215 connects to first gas source 205 and to the enclosure 225, and second gas hose 220 connects to second gas source 210 and to the same enclosure 225. In some exemplary embodiments, the enclosure 225 is made from materials and constructed to meet NEMA 4X specifications as hereinbelow defined. Further, as shown in FIG. 2B, in some exemplary embodiments, the enclosure is divided into two separate compartments 241a/241b by a divider 230. The divider 230 separates the compartments and in some embodiments the divider 230 is sealed along all of its edges, including the front edge which impacts a door (not shown) so that no gas can transfer from one compartment to the other. In this exemplary embodiment, the at least two compartments are used in brazing system 200 to prevent mixing of the oxygen/air with the fuel before the gases reach the brazing torch where they form a mixed gas. In some embodiments, in case of a gas leak inside first compartment 241a and/or second compartment 241b, each compartment or a component inside each enclosure includes a pressure relief valve 235 that exhausts to an external atmosphere. In further exemplary embodiments, as shown in FIG. 2B the compartments utilize vent structures in the enclosure 225 which allows for the harmless venting of any leaked gas without the building of pressure within the compartments. That is, the compartments contain vents 247 in at least their sidewalls to allow for the venting of any leaked gas. Moreover, in other exemplary embodiments, fans or ventilation units can be coupled to the vents 247 or any other ventilation orifices to aid in the venting of the compartments. That is, the fans or ventilation units can be used to either blow in ambient air to constantly create a flow through the compartments or can draw through the vents (openings) and direct the drawn gasses to away from the enclosure 225. In yet another embodiment (not shown), the enclosure includes a gas leak detection system. It should be further noted, that embodiments of the present invention can utilize more than two separate gases and can be implemented with systems using three or more gases, where the gases are managed within a single enclosure as explained herein, without departing from the spirit or scope of the present invention.

As used in this application, "NEMA 4X" means an enclosure which is fabricated from stainless steel or plastic, including airtight and non-airtight enclosures. The NEMA 4X enclosure can be used in harsher environments than standard NEMA 4 units since the NEMA 4X enclosure has corrosion resistance. Applications where corrosive materials (for example saltwater) and caustic cleaners are used necessitate the use of a NEMA 4X enclosure.

In the illustrated embodiment of FIG. 2A, first gas hose 215 connects to first inlet 225a and supplies gas to tubing 250 that connects to first pressure regulator valve 240a. First pressure regulator valve 240a maintains pressure of first gas source 205 to downstream points of use. Tubing 250 extends between first inlet 225a, first pressure regulator valve 240a, first micrometer valve 240b (or any other device having a settable variable orifice), optional pressure gauge 245, and first outlet 225b. In some exemplary embodiments, the pressure gauge 245 is not present within the enclosure 225. For example, in some exemplary embodiments the pressure gauge 245 is positioned upstream of the first micrometer valve 240b and is not located within the enclosure. Additionally, in other exemplary embodiments, the pressure gauge 245 is coupled to the pressure regulator 240a, and thus located upstream of the first micrometer valve 240b, as shown in FIG. 2B, where the pressure gauge is mounted on the valve 240a, and thus both the valve 240a and the gauge 245 are positioned upstream of the valve 240b. In other embodiments, an additional (not shown) pressure gauge can be located outside of the enclosure. In other exemplary embodiments (not shown), micrometer valve can be replaced with a fixed orifice when the brazing system is being used for a specific product or process or can be replaced with flow meters with integral valves. In some exemplary embodiments, first outlet 225b of first compartment 241a connects to optional first flow meter (not shown) outside of the enclosure, either adjacent or at a distance from enclosure 225. First pressure regulator valve 240a and first micrometer valve 240b can be manually or electrically controlled to set and/or maintain a first pressure and a first flow rate, respectively, of first gas source 205. The optionally used flow meter can be manually or electrically measured.

Further in the illustrated embodiment, second gas hose 220 connects to second inlet 230a and supplies gas to tubing 275 that connects to second regulator pressure valve 265a. Tubing 275 extends between first inlet 230a, second pressure regulator valve 265a, second micrometer valve 265b (or any other device having a settable orifice), optional pressure gauge 270, and second outlet 230b. Like in the first compartment, in some exemplary embodiments, the pressure gauge 270 is not present within the enclosure 225. For example, in some exemplary embodiments the pressure gauge 270 is positioned upstream of the second micrometer valve 265b and is not located within the enclosure. Additionally, in other exemplary embodiments, the pressure gauge 270 is coupled to the pressure regulator valve 265a, and thus located upstream of the first micrometer valve 265b, as shown in FIG. 2B, where the pressure gauge 270 is mounted on the valve 265a, and thus both the valve 265a and the gauge 270 are positioned upstream of the valve 265b. In other embodiments, an additional (not shown) pressure gauge can be located outside of the enclosure. In another embodiment (not shown), micrometer valve can be replaced with a fixed orifice when the brazing system is being used for a specific product or process. In the illustrated embodiment, second outlet 230b of second compartment 241b connects to an optional second flow meter (not shown) outside of the compartment, either adjacent or at a distance from enclosure 225. Second pressure regulator valve 265a and second micrometer valve 265b can be manually or electrically controlled to set and/or maintain a second pressure and a second flow rate, respectively, of second gas source 210. The optional flow meter can be manually or electrically measured. It is understood that the tubing, regulator valves, pressure gauges, micrometer valves, and flow meters can be arranged in another configuration other than what is illustrated in FIG. 2A as long as the pressures and flow rates of first gas source and second gas source are controlled.

First gas source 205 flows from first compartment 241a into first brazing torch gas hose 285, and second gas source 210 flows from second compartment 241b into second brazing torch gas hose 290. First brazing torch gas hose 285 and second brazing torch gas hose 290 connect to brazing torch 291. Brazing torch 291 includes handle 292, operating trigger 293 or on/off switch, neck 294, and brazing tip 295. Brazing torch 291 includes an internal portion (not shown) where the gases mix before exiting the brazing torch 291 at brazing tip 295.

An operator activates operating trigger 293 on brazing torch 291 to light the torch, but brazing torch 291 does not include any flow control metering valves positioned on the torch for adjustment of first gas 205 and second gas 210 as illustrated in FIG. 1. Instead, an operator using the brazing system 200 can employ the control system 296 having user interface 297 or the operator manually makes adjustments to brazing system 200 valves based on settings entered into and received from control system 296 having user interface 297. That is, in some embodiments the valves of the system 200 can be controlled automatically by the control system 296, while in other embodiments the control system 296 and user interface 297 are separate from the enclosure 225, etc. such that the user can utilize the control system 296 and user interface 297 to obtain proper settings and then the operator manually sets the valve settings in the enclosure to the settings indicated by the control system 296 (discussed further below). In some embodiments, the control system 296 includes optional control connections 299 that connect to components in the enclosure 225. In another embodiment (not shown), control system is a wireless control system. In yet another embodiment (not shown), the brazing torch includes a plurality of valves, on/off valves for example, positioned on the torch that are wide open, therefore, the operator using the brazing system uses the control system having user interface or the operator manually makes adjustments to the brazing system based on settings entered into and received from the control system having user interface. Further, in other exemplary embodiments, simple flow on/off valves can be positioned on the outside, or within, the enclosure 225 to turn off flow, but are not flow control metering valves.

It is noted that simple on/off flow valves are not flow control metering valves. On/off valves are used to stop or permit flow and are not used to meter the flow through the torch, or any other devices, or the ratio of different gasses. Examples of flow metering valves or devices include the micrometer valves and pressure regulators described herein. Micrometer valves meter gas flow by using a graduated scale on the valves to allow the flow to be adjusted in increments through the valve and pressure regulators or pressure regulator valves are devices that regulate and maintain a gas pressure from a higher inlet pressure to a maintained lower delivery pressure. Thus, as described herein the valves 240a, 240b, 265a and 265b are flow control metering valves.

In exemplary embodiments, control system 296 (which will be discussed in more detail below) includes a plurality of parameters, including at least two gases, at least two pressures, at least two coefficients of flow, at least two flow rates, at least two micrometer readings, and at least one type of brazing flame. At least one of the plurality of parameters is entered into user interface 297 and saved and stored in the control system 296, and control system 296 is configured to determine or calculate at least one parameter, which can be a gas ratio—for example.

Further in the illustrated embodiment, control system 296 is configured to determine and/or to control at least a ratio of flow rates of first gas 205 and second gas 210, also known as the oxygen to fuel ratio. Each of the fuel gases, including acetylene, propane, natural gas or methane, propylene, hydrogen, and butane, has a range of oxygen to fuel ratio that produces a consistent brazing flame every time the operator lights the brazing torch. For example, the oxygen to fuel ratio is set to reproduce a targeted and maximized oxidizing flame, a neutral flame, a carburizing flame, or any flame having characteristics between the above identified flames as known by those of skill in the art.

As discussed above, exemplary embodiments of the brazing system 200 include an automated control system 296 having user interface 297 or alternatively includes control system 296 having user interface 297 where the operator makes manual adjustments. In brazing system 200 where the operator makes manual adjustments, an operator enters the types of gases, for example oxygen and propane, reads the pressures from the regulator valves and settings of the micrometer valves, and enters these readings into the user interface 297 of the control system 296. Control system 296 determines or calculates the flow rates and coefficients of flow for the gases and the gas ratio for the gas combination and indicates whether the gas ratio is within an acceptable range. If the operator decides that the brazing system is properly setup, the operator saves the settings and can lock the enclosure 225 that houses the regulator valves and micrometer valves and the brazing flame will have an oxygen to fuel ratio that produces a consistent brazing flame every time the operator lights the brazing torch. If not properly setup, the operator makes changes to at least one of the regulators and/or micrometers and repeats the previous process.

In a brazing system 200 with an automated control system 296 having user interface 297, an operator enters or selects at least the types of gases from a list of gases in user interface 297 and control system 296 will determine at least one of the following: pressure readings from the regulator valves, readings from the micrometer valves, gas flow rates, coefficients of flow, and the gas ratio. Control system 296 indicates whether the gas ratio is within an acceptable range and can be saved and locked so that settings can be selected and so changes can only be made by operating personnel with system access. Once saved and/or locked, the brazing system will provide a flame that will have an oxygen to fuel ratio that produces a consistent brazing flame every time the operator lights the brazing torch. If the gas ratio is not within an acceptable range, control system 296 can be configured to make adjustments to at least one regulator and/or micrometer until the gas ratio is within an acceptable range. In another embodiment, the control system includes a user interface whereby a target for at least one of the following may be entered by an operator and an actual value of at least one of the following may be monitored by the control system: a gas type, a pressure, a micrometer setting, a coefficient of flow, at least one flow rate, a gas ratio, and at least one type of brazing flame.

FIG. 2B illustrates an exemplary embodiment of the enclosure 225. As shown, the enclosure 225 has a plurality of walls 227a, upper and bottom portions 227b and a back portion 227c which create the enclosure 225. The enclosure is open on one side and can be covered by a door structure (not shown for clarity). The door can be attached by any known means, such as a hinge structure and can be secured using a latching mechanism 248. The latching mechanism 248 can also be a lock which can be secured to prevent a user from changing any settings of the components inside the enclosure 225. As described above, a divider 230 is used to separate distinct compartments 241a/241b within the enclosure. The divider 230 can be secured to the enclosure surfaces in such a way as to create a seal between compartments so that no gases mix in the enclosure 225. Further, an outer surface 237 of the divider 230, which is adjacent a door when the door is closed, can have a seal device (not shown) which completes the compartmentalization of the enclosure. For example, a rubber or neoprene seal can be used on the surface 237 to seal the compartments from each other. Further, although the vents 247 are shown on the walls 227*a* of the enclosure 225, the vents 247 can be positioned at any other location on the enclosure so that they provide the desired venting of the compartments if a gas is leaked. In exemplary embodiments, there are no vents placed in the divider 230 to maintain separation. Further, as previously explained the vents 247 can be ports, or other types of orifices in the enclosure which allow a ventilation or vacuum system to be coupled to the compartments to aid in the evacuation of any leaked gases.

Figure 3:
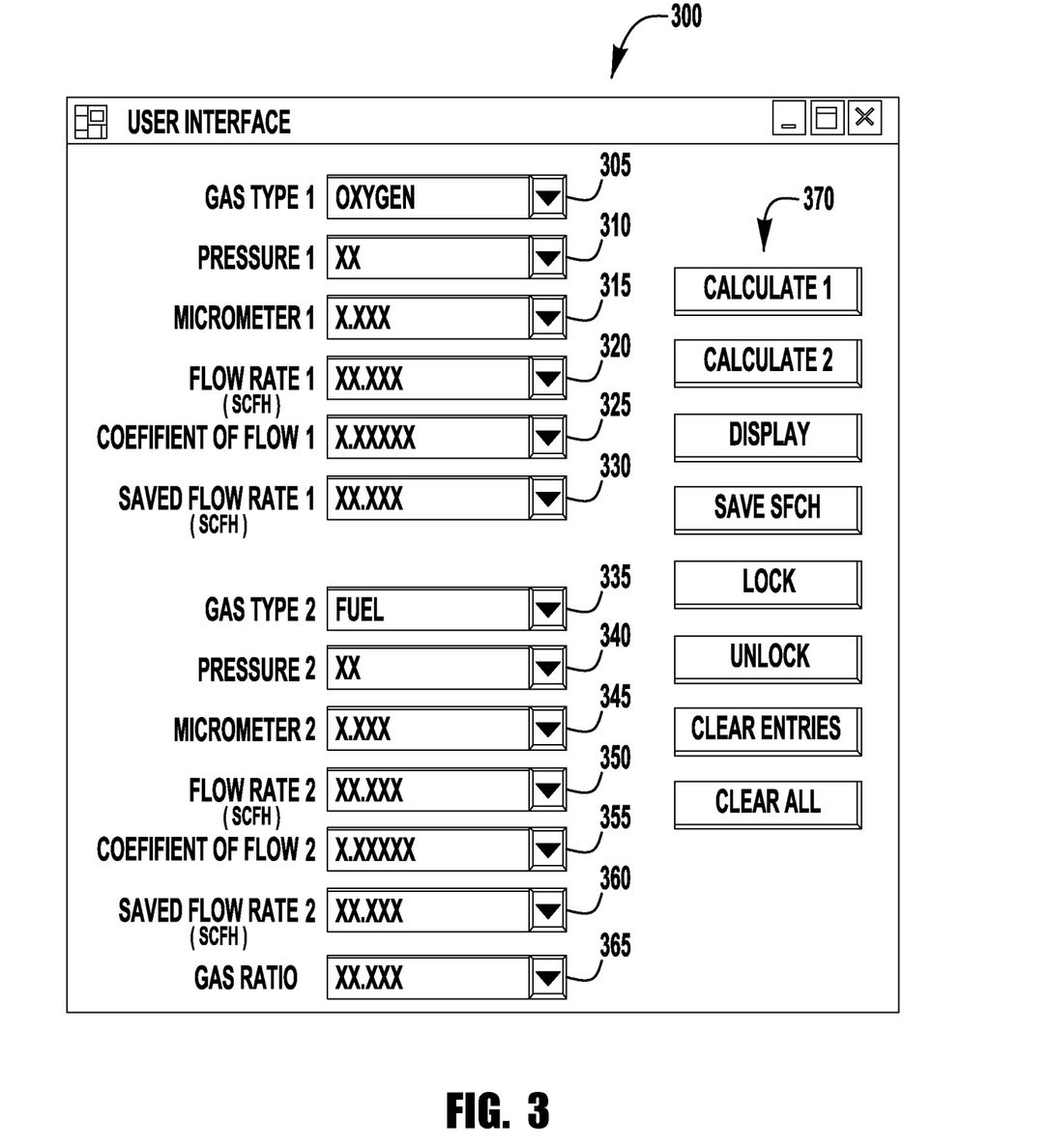
FIG. 3 is a schematic of a brazing system user interface.

FIG. 3 illustrates an exemplary user interface 300, which is an example of the user interface that can connect to control system 296, discussed above. In the illustrated embodiment, user interface 300 includes a plurality of parameters, including: gas type one 305, pressure one 310 in pounds per square inch (PSIG) (or other units), micrometer setting one 315, flow rate one 320 in standard cubic feet per hour (SCFH) (or other units), coefficient of flow one 325, and flow rate one 330. Further, user interface 300 includes gas type two 335, pressure two 340 in pounds per square inch (PSIG), micrometer setting two 345, flow rate two 350 in standard cubic feet per hour (SCFH), coefficient of flow two 355, and flow rate two 360.

In the illustrated embodiment, user interface 300 calculates gas ratio 365 or the oxygen to fuel ratio for gas type one and gas type two and indicates whether the gas ratio is within an acceptable range. If a manual control system is being used, an operator compares the gas ratio to a table of acceptable gas ratios. It is understood that the user interface can be arranged in another configuration other than what is illustrated in FIG. 3 as long as the plurality of parameters can be manually entered or electronically monitored and entered. For example, user interface can include one entry location and a drop down list that an operator can choose from or enter each of the following: gas type, pressure, micrometer setting, flow rate, coefficients of flow, saved flow rate, and gas ratio. Further, user interface 300 includes at least one button or graphical user interface portion 370, including but not limited to the following: calculate, display, save, lock, unlock, acceptable range, unacceptable range, clear entries, and clear all. Because parameters can be saved, a user can lookup previously saved settings in user interface 300 and select the same parameters for an upcoming brazing operation. Further, user interface can include a security or lock system to limit additions to or changes to the control system.

Figure 4:
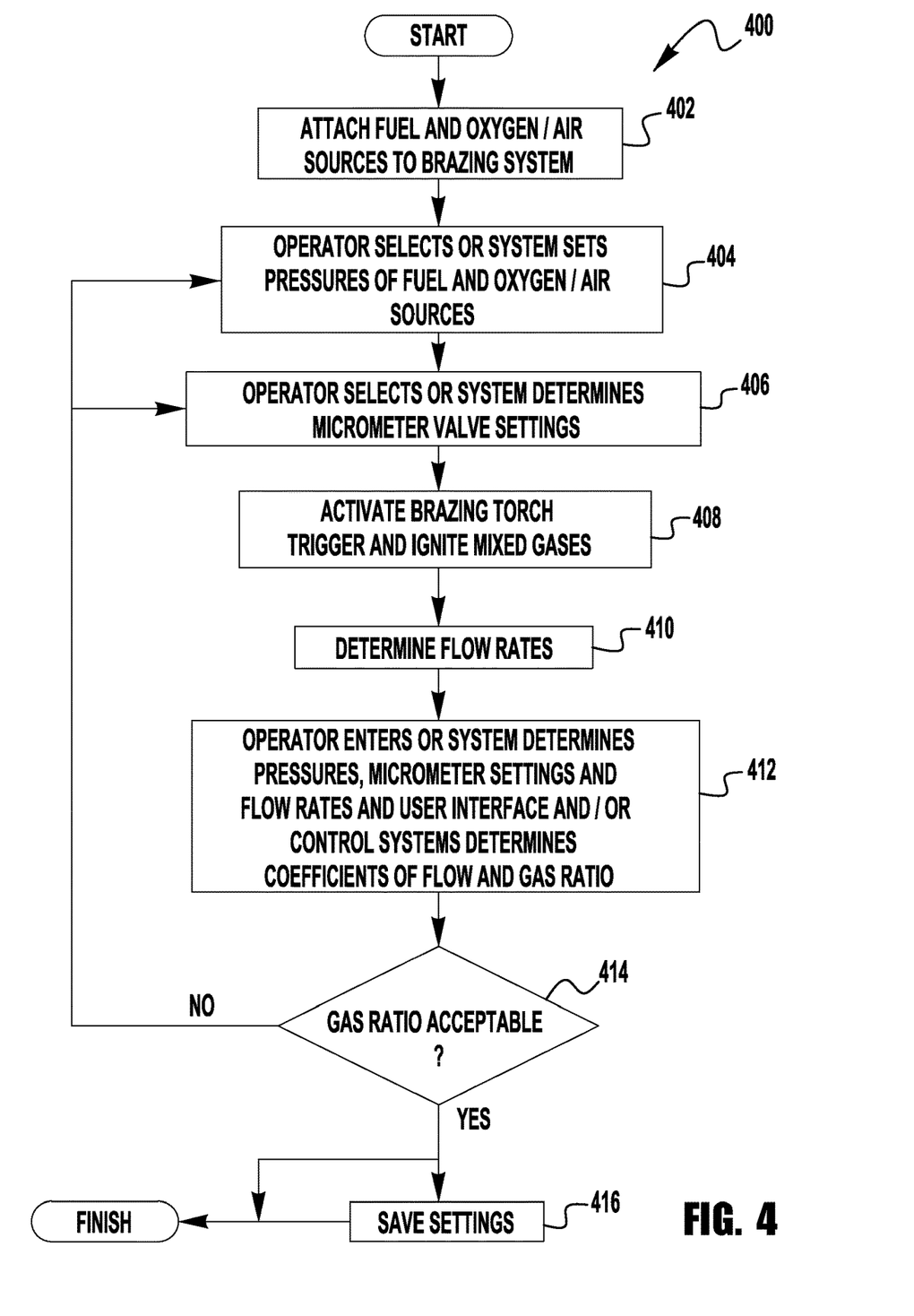
FIGS. 4-6 are flow charts illustrating embodiments of a brazing method.

A user interface 300 or computer illustrates one possible hardware configuration to support the systems and methods described herein, including the methods 400 below. In order to provide additional context for various aspects of the present invention, the following discussion is intended to provide a brief, general description of a suitable computing environment in which the various aspects of the present invention may be implemented. Those skilled in the art will recognize that the invention also may be implemented in combination with other program modules and/or as a combination of hardware and software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

The computer or the user interface 300 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within the computer, such as during start-up, is stored in the ROM.

The computer or the user interface 300 can further include a hard disk drive, a magnetic disk drive, e.g., to read from or write to a removable disk, and an optical disk drive, e.g., for reading a CD-ROM disk or to read from or write to other optical media. The computer or the user interface 300 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the user interface 300.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the computer or the user interface 300 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display can be employed with user interface 300 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the user interface 300 via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

FIG. 4 is a flow chart illustrating, for example only, one embodiment of a brazing method 400 using brazing system 200. As shown in FIG. 4, an operator attaches fuel and oxygen or air sources to the brazing system at 402. The pressures for the fuel and oxygen are selected by an operator or set by the system at 404 and the micrometer valves are set by the operator or system at 406. Brazing torch trigger is activated by operator and the mixed gases are properly ignited at 408. At 410, the operator reads flow rates from the flow meters or the system automatically takes the same readings. At 412, the operator enters pressures, micrometer settings, and flow rates into user interface or the system determines these values and the user interface calculates the coefficients of flow and the gas ratio for the selected gases. At 414, user interface indicates whether the gas ratio is acceptable or the operator compares the gas ratio to a table of acceptable gas ratios for the combined gases. If gas ratio is not acceptable, pressures of gases can be changed at 404 and/or micrometer valve settings can be changed at 406. If the gas ratio is acceptable, the operator starts/continues brazing operation and settings can be optionally saved for later usage at optional 416. It is understood that the brazing method 400 using brazing system 200 can be arranged in another configuration other than what is illustrated in FIG. 4 as long as an operator can determine that the gas ratio is within an acceptable range.

Figure 5:
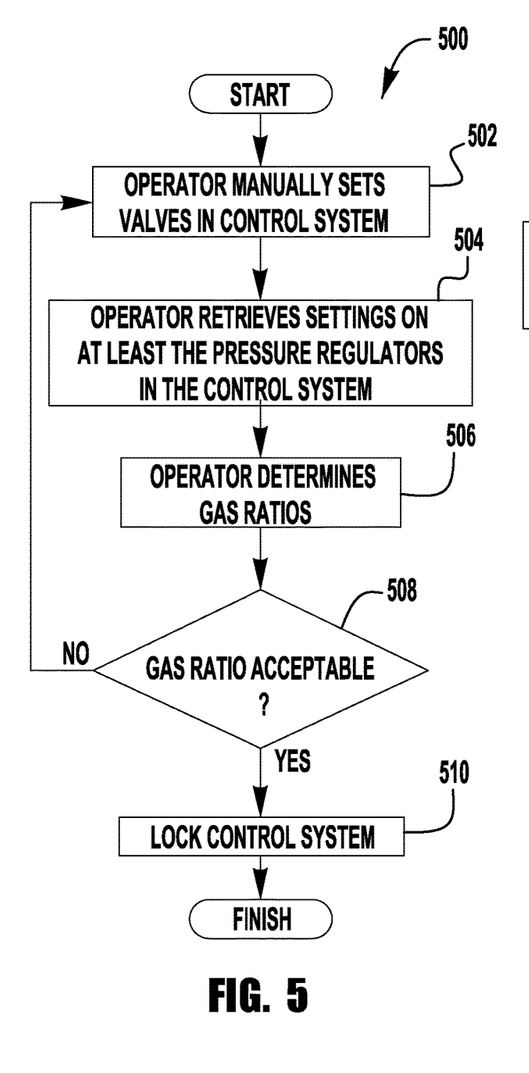

FIG. 5 is another flow chart illustrating, for example only, an embodiment of a brazing method 500 using brazing system 200. As shown in FIG. 5, an operator manually sets valves in a control system that is part of the brazing system at 502. For example, the pressures for the fuel and oxygen are selected and/or the micrometer valves are set by an operator. At 504, the operator manually retrieves settings on at least one of the pressure regulators in the control system. The operator determines the gas ratios at 506 and then determines if the gas ratio is acceptable at 508. At 508, the operator compares the gas ratio to a table of acceptable gas ratios for the combined gases. If gas ratio is not acceptable, the operator can change valve settings at 502. If the gas ratio is acceptable, the operator locks the control system at optional 510. It is understood that the brazing method 500 using brazing system 200 can be arranged in another configuration other than what is illustrated in FIG. 5 as long as an operator can determine that the gas ratio is within an acceptable range.

Figure 6:
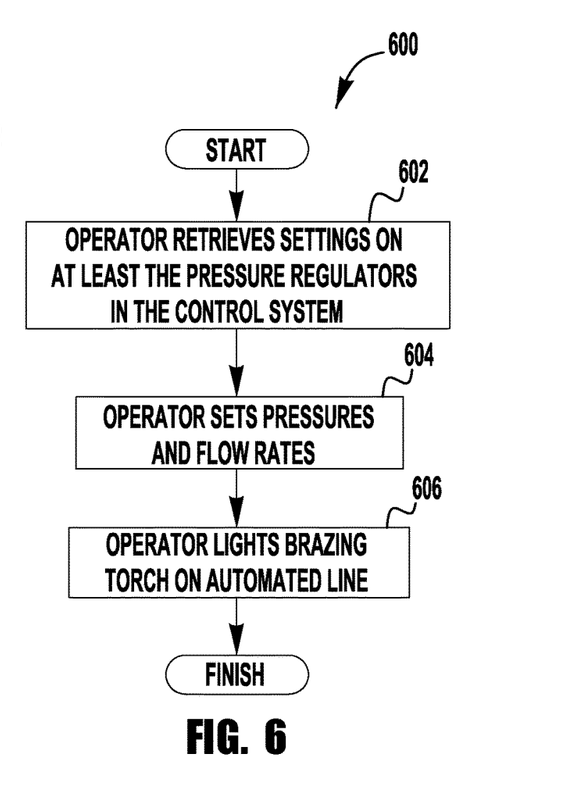

FIG. 6 is another flow chart illustrating, for example only, an embodiment of a brazing method 600 using brazing system 200. As shown in FIG. 6, an operator retrieves known gas ratios, pressures, and flow rates at 602. For example, the gas ratios, pressures, and flow rates may be known because the brazing system had been previously used and these values were recorded. At 604, the operator sets pressures and flow rates in the brazing system that may be part of an automated brazing operation, for example a furnace having multiple brazing stations or a round indexing brazing machine. The operator then lights the brazing torch at 606, wherein the flame from the brazing torch may have the gas ratio retrieved by the operator.

Figure 7:
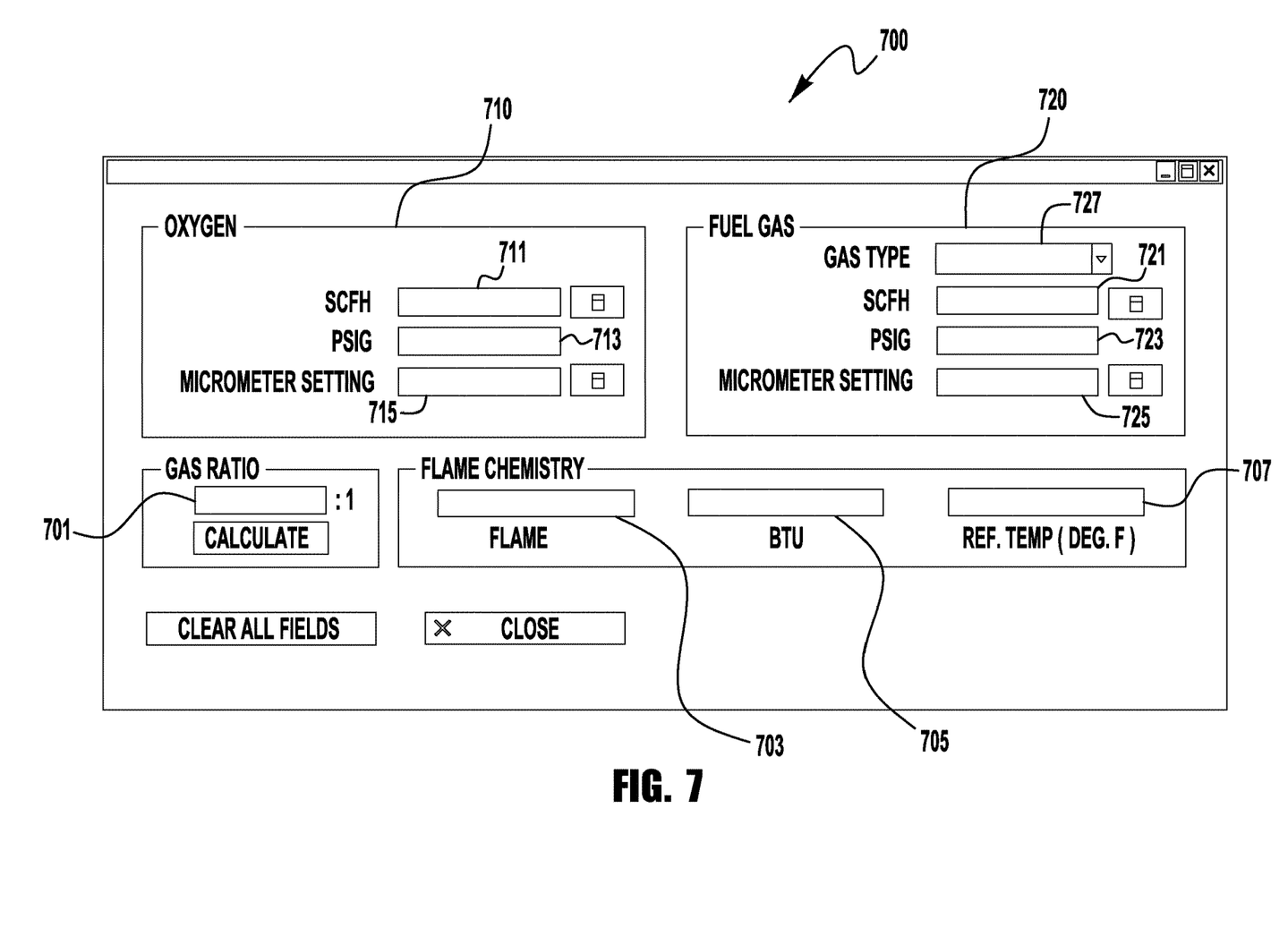
FIG. 7 is a schematic of a brazing system interface.

FIG. 7 depicts the user interface 700 for another exemplary embodiment of the present invention. As described earlier, brazing operators can have difficulty in achieving repeatable settings for the gases used in a brazing operation. Some difficulties can be encountered in trying to obtain a neutral flame, which is not always achieved in known systems. Moreover, even if a neutral flame each time a brazing operation is performed the respective flames can have vastly different BTU and/or heat outputs. Thus, two different operators can both set a neutral brazing flame but one can generate a flame having a BTU output of 15,000 while the other can have a BTU output of 30,000, where the flames otherwise look very similar. This inconsistency can cause issues in brazing, particularly when the components to be brazed are particularly thermally sensitive. Moreover, these inconsistencies can cause significant waste of resources and gases as many brazing operations can be done at much higher heat and BTU flame outputs than necessary for a given operation. Embodiments of the present invention address these issues by being able to provide a consistent and repeatable neutral flame, but also can control BTU output and heat of the flame with accurate repeatability to optimize any brazing operation.

Turning to FIG. 7, in this embodiment the control system 296 contains a look up table, state table, or other type of calculation module which uses user input data (described more fully below) to calculate gas ratio and flame chemistry parameters and display that information on the user interface. The control system 296 programming utilizes the input data to automatically calculate the gas ratio and flame chemistry for given brazing parameters and the user interface 700 (shown on interface 297) displays this information to the operator. This aspect of the present invention will be explained further below, in conjunction with describing the utilization of this embodiment of the present invention.

As shown, the user interface 700 contains a first display area 710 to display information related to a first gas used for the brazing operation. As shown the first gas can be oxygen, however in other applications the first gas can be air. The interface 700 also contains at least one second display area for a second gas, which is typically a fuel gas. Of course, if additional gases are utilized, additional display areas with similar characteristics can be shown.

The first display area 710 contains three user input parameters. They are: gas flow rate 711, gas flow pressure 713 and micrometer setting 715. The second display area contains four user input parameters. They are: gas type 727, gas flow rate 721, gas flow pressure 723, and micrometer setting 725. It is noted that in some exemplary embodiments, the first display area 710 can also have a gas type input parameter similar to that shown in the second display area.

Before operation, a user selects the gas type for each of the gases used for the brazing operation and inputs the gas type at 727 (if the selection is made available for the first gas the user would make a gas type selection for the first gas as well). The user also inputs a pressure for each gas at 713 and 723 respectively. This gas pressure data can be read from the pressure regulator valves 240a/265a, respectively, or they can come from any other source such as "best guess" starting position. They can be a desired setting, or a historically used setting for a given operation. The operator also inputs one of either the flow rate or micrometer valve 240b/265b settings in the respective input portions of the display areas. For example, the operator can read the micrometer valve settings and input that data in the inputs 715/725, respectively; or the operator can obtain flow rates from flow meters (not shown in FIG. 2A, but which can be used) and input that data in the inputs 713/723, respectively. In other embodiments, the operator can input the micrometer valve setting of one of the gases and the flow rate of the other gas. That is, embodiments of the present invention allow an operator to input any one of the micrometer valve setting or flow rate for each of the respective gases, whichever is available. As with the pressure, the input data can come from actual settings of the system components or measured flow rates, or can come from historical or best guess estimates for ideal data inputs.

Once the user input data is input, as described above, the control system 296 then uses its look up table, programming, etc. to calculate and display the data input not input by the operator. For example, if the user inputs the pressure, gas type and micrometer valve setting the control system 296 calculates the flow rate that corresponds with this data and displays it in the appropriate display areas 711/721. The look up table, etc. utilized by the control system uses the input data, in conjunction with various other information to make this calculation, included but not limited to gas density, etc.

The operator can then instruct the control system 296 to calculate the gas ratio 701, flame type 703, flame BTU output 705 and relative flame temperature 707, which it does and then it displays this information on the display 700. For example, the display 700 can utilize a "Calculate" button which initiates this calculation. Like the calculations above, the control system 296 uses its look up table, etc. and its programming to determine the gas ratio, flame chemistry BTU output and relative flame temperature for a flame that would be created with the input data. This look up table, etc. and programming utilizes various physical, thermodynamic and stoichiometric properties and calculations to determine the gas ratio and flame chemistry of a flame based on the input data input by the operator. That is, for any given set of input variables (described above) the look up table, etc. and the programming within the control system 296 can determine and display the flame properties to allow an operator to determine whether or not the flame properties are desirable for a given brazing operation. If any of the calculated flame properties are outside of a desirable range the operator can adjust any of the input parameters until desired or optimal flame properties are calculated and displayed. Then, the operator can adjust the valves 240a/b and 265a/b appropriately to ensure that the desired brazing operation is performed. Thus, an operator can use the user input 700 and the control system 296 to determine an optimum setting for each of the gas pressure and micrometer valve for each gas, for any given brazing operation. Once these optimal parameters are identified and set in the enclosure 225, the enclosure can be locked to prevent any random or undesired adjustment of the settings. Further, the display 700 and/or control system 296 can have security settings to prevent any unauthorized users from adjusting, modifying or changing any of the operational parameters.

In further exemplary embodiments, the display 700 can display information in various ways to provide the operator with desired information to ensure an ideal flame is repeated. For example, in some exemplary embodiments, the control system 296 can display on the display 700 "NEUTRAL" in the flame display 703 to indicate that the various input parameters will provide a neutral flame. Also, the control system 296 can display "CARBURIZING" if the input data implicates a carburizing flame, and "OXIDIZING" if the input data implicates an oxidizing flame. Additionally, other exemplary embodiments can use other visual indicators to provide the operator with the desired information. For example, color coding can be displayed where each type of flame is displayed with a different color, such that the display area 703 can have a green background for a neutral flame, a blue background for an oxidizing flame and a red background for a carburizing flame. Of course other colors or visual indicator types can be used.

In each of the BTU and relative temperature displays 705/707 the determined BTU and relative temperature output, based on the input data, is displayed. The relative temperature is the temperature of the brazing flame about ⅛" off the end of the torch tip at the center of the flame.

Based on the displayed data, the operator can then adjust the input data to achieve a desired brazing flame. For example, if the display shows that the flame is not neutral, the operator can adjust various input parameters until the flame is shown to be neutral. Also, the input parameters can be adjusted to decrease or increase the BTU and relative flame temperature of the flame to a desired level. For example, if the displayed BTU output is too high, the operator can adjust the input parameters until as desired BTU output is achieved. If this adjustment changes the flame type—for example to a non-neutral flame—then this will be displayed and the user can then adjust the input parameters until the flame type is displayed as neutral. Thus, embodiments of the present invention allow an operator to ensure that they utilize a brazing flame that has the desired flame type, BTU output and relative temperature. Once the desired flame properties are displayed the operator can manually adjust the valves 240*a*/240*b* and 265*a*/265*b* to the displayed settings and begin the brazing operation. In alternative embodiments the control system 296 can electronically set the valves.

It should be noted that in exemplary embodiments of the present invention each of the determined or calculated BTU, flame type and relative temperature of the flame is determined independent of the type or brand of the torch (and other equipment being utilized). As such, embodiments of the present invention can be used with many different manufacturer brands and types of torches. For example, in exemplary embodiments, the control system 296 utilizes the amount of fuel being utilized and the type of fuel being used to determine flame BTUs, whereas each of the flame type and relative temperature of the flame are a function of the ratio of oxygen to fuel.

In some exemplary embodiments of the present invention, the look up table, etc. and programming in the control system 296 displays a particular flame type for a range of input parameters and thus gas ratios. That is, it has been discovered that there is no one single gas ratio that provides a neutral, carburizing or oxidizing flame with various input parameters, but a range of gas ratios that can provide a particular flame so long as the gas ratio is within that range. For example, a neutral flame type can be achieved so long as the gas ratio is within a range of gas ratios for the given input parameters input by the operator. Thus, in exemplary embodiments, a "NEUTRAL" flame indication will be displayed for a range of gas ratios. Thus, the control system 296 and display 700 will display "NEUTRAL" so long as the calculated gas ratio is within that range. Thus, the look up table, etc. and programming in the control system 296 will indicate that a flame is neutral so long as the gas ratio is within that range, regardless of whether or not the gas ratio is near the end points of the range. This allows an operator to adjust the input parameters (discussed above) to obtain a flame that has the desired properties—for example neutral—but utilizes less fuel gas then would otherwise be used. This allows a user to maximize the cost effectiveness of a brazing operation while ensuring that the brazing operation still meets the desired parameters. That is, the operator can be assured that the flame type to be created is still neutral, even though the fuel gas has been reduced. Thus embodiments of the present invention indicate a flame type as a neutral flame type when the gas ratio is within a range of gas ratios, based on the input parameters input by the user; indicate a flame type is a carburizing flame when the gas ratio is below the range; and indicating an oxidizing flame when the ratio is above the range.

As briefly explained above, the indication of flame type (neutral, oxidizing or carburizing) is a function of the oxygen to fuel gas ratio, determined by the control system 296. However, the control system 296 also takes into account the type of fuel being utilized. That is, the ratios that produce certain flames types for a first type of fuel will not be the same for a different type of fuel. Stated differently, a first gas ratio will produce a neutral flame when using acetylene, but the same ratio may not produce a neutral flame when using other types of fuel gas, such as propane, etc. Therefore, the control system 296, utilizing its look-up table (or other means), takes into account the type of fuel and the gas ratio when determining the flame type to display. Similarly, the ranges of gas ratios which produce neutral, oxidizing or carburizing flame types will be different for each type of fuel gas used, and thus the control system 296 (via look-up table, etc.) takes these factors into account when displaying the appropriate flame type.

In other exemplary embodiments, the control system 296 and display 700 are capable of breaking the above gas ratio range that produces a neutral flame type into a plurality of sub-ranges and changes the display based on which sub-range the gas ratio falls in. For example, the control system 296 (its programming etc.) can break the gas ratio range described above into three sub ranges, where: if the determined gas ratio falls within the center sub-range a "NEUTRAL" flame type indication 703 is made; if the determined gas ratio is in the higher sub range (from the mid-sub range to the high end of the gas ratio range) a "NEUTRAL-OXY" flame type indication 703 is made; and if the determined gas ratio is in the lower sub range (from the mid-sub range to the low end of the gas ratio range) a "NEUTRAL-CARB" flame type indication 703 is made. This allows an operator to select operational parameters which, while still producing a neutral flame, produces a flame that is either oxygen rich or fuel gas rich. Thus, this can be used to provide a desired brazing flame that optimizes the cost of the brazing process—for example by preventing the over utilization of a fuel gas. In other exemplary embodiments that use other visual indicators (like colors described above) the display can display different colors, or combined colors based on which sub range the calculated gas ratio is within. For example, if the gas ratio is within the a "NEUTRAL-OXY" sub range the display 703 can be displayed with a combined green and blue color pattern. Of course, other display combinations can be used without departing from the spirit or scope of the present invention.

With exemplary embodiments of the present invention, an operator can determine optimal valve settings for the valves in the enclosure 225 for a given brazing operation and prevent those settings from being inadvertently changed. Additionally, an operator can ensure that brazing flames are consistently and repeatedly produced for a given brazing operation. Thus, the guess-work and inconsistencies of brazing operations associated with prior art systems are eliminated by embodiments of the present invention. Moreover, optimal brazing parameters can be selected without having to ignite the brazing flame repeatedly.

Additionally, although not shown in FIG. 7, the interface 700 can be used in conjunction with the control system 296 to allow for the saving of parameters and settings for various operations. That is, an operator can use the control system 296 to save parameter settings for many different brazing operations and call those settings up by using the saved parameters for the brazing operation to be informed. Further, in exemplary embodiments, the control system 296 and user input 297 can be a separate, stand-alone computer system which is used by a supervising individual, or a third party, who determines the optimal parameters for a given brazing operation. The individual uses the control system 296 to determine the optimal parameters (described above) and those settings are employed on the valves in the enclosure 225. The enclosure 225 can then be locked ensuring that operators are incapable of altering the settings and adversely affecting the brazing operation. This ensures that brazing operations optimize performance and cost, while at the same time ensuring that a brazing operation can be made consistent from one operator to the next. Such consistency, repeatability and performance is not available with known systems.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A brazing operation system, the system comprising:
a programmable processor-based user interface having a first display region, a second display region, a third display region, and a fourth display region, where
the user interface is programmed for the first display region to accept user inputs related to a first gas, including a first pressure and any one of a first micrometer valve setting and a first flow rate for the first gas,
the user interface is programmed for the second display region to accept user inputs related to a second gas, including a second gas type, a second pressure and any one of a second micrometer valve setting and a second flow rate for the second gas,
the user interface is programmed for the third display region to display a gas ratio between the first and second gases based on the user inputs in each of the first and second display regions, and
the user interface is programmed for the fourth display region to display a flame type, a flame energy value, and a relative temperature of a flame to be created by the first and second gases; and
a programmable processor-based control system coupled to the user interface,
wherein the control system is programmed to determine either the first micrometer valve setting not input or the first flow rate not input based on the user inputs from the first display region, and programmed to determine either the second micrometer valve setting not input or the second flow rate not input based on the user inputs from the second display region,
wherein the control system is further programmed to determine the gas ratio based on the user inputs from the first and second display regions and display the gas ratio in the third display region, and
wherein the control system is programmed to determine each of the flame type, the flame energy value, and the relative temperature of a flame based on at least two of the user inputs from the first display region, the user inputs from the second display region, the gas ratio, and the second gas type, and display each of the flame type, the flame energy value, and the relative temperature of a flame in the fourth display region.

2. The brazing operation system of claim 1, wherein the second gas can be any one of acetylene, propane, natural gas, methane, propylene, hydrogen, butane, or blends thereof.

3. The brazing operation system of claim 1, wherein the flame type is any one of a neutral flame, an oxidizing flame, and a carburizing flame.

4. The brazing operation system of claim 1, wherein the user interface is programmed to utilize, in the fourth display region, a first identifier for a first flame type, a second identifier for a second flame type, and a third identifier for a third flame type.

5. The brazing operation system of claim 1, wherein the control system is programmed to determine the flame type to be one of a first, a second, or a third flame type based on the gas ratio and the second gas type.

6. The brazing operation system of claim 5, wherein the control system is programmed to use a first gas ratio range to determine that the flame type is the first flame type, a second gas ratio range to determine that the flame type is the second flame type, and a third gas ratio range to determine that the flame type is the third flame type.

7. The brazing operation system of claim 1, wherein the control system is programmed to set the gas ratio to reproduce a targeted and maximized oxidizing flame, neutral flame, or carburizing flame.

8. The brazing operation system of claim 1, wherein the control system is programmed to monitor for changes in at least one of a first gas type of the first gas, the second gas type, the first pressure, the second pressure, the first micrometer valve setting, the second micrometer valve setting, the first flow rate, the second flow rate, the gas ratio, the flame type, the flame energy value, or the relative temperature of the flame.

9. The brazing operation system of claim 1, wherein the control system is programmed to make adjustments to at least one of the first micrometer valve setting or the second micrometer valve setting until the gas ratio is within an acceptable range.

10. The brazing operation system of claim 1, wherein the first gas is oxygen or air.

11. A brazing operation system, said system comprising:
a programmable processor-based user interface programmed to: accept a first user input to set a first pressure for a first gas in response to the first user input, accept a second user input to set any one of a first micrometer valve setting and a first flow rate for the first gas in response to the second user input, accept a third user input to set a second pressure for a second gas in response to the third user input, and accept a fourth user input to set any one of a second micrometer valve setting and a second flow rate for the second gas in response to the fourth user input; and
a programmable processor-based control system operatively connected to the user interface and programmed to determine either the first micrometer valve setting not input or the first flow rate not input based on the first and second user inputs, and to determine either the second micrometer valve setting not input or the second flow rate not input based on the third and fourth user inputs,
wherein the user interface is programmed to display a gas ratio between the first and second gases based on the first, second, third, and fourth user inputs, and
wherein the control system is further programmed to determine a flame type, a flame energy value, and a relative temperature of a flame to be created by the first and second gases, and
wherein the user interface is further programmed to display the flame type, the flame energy value, and the relative temperature of the flame.

12. The brazing operation system of claim 11, wherein the second gas can be any one of acetylene, propane, natural gas, methane, propylene, hydrogen, butane, or blends thereof.

13. The brazing operation system of claim 11, wherein the flame type is any one of a neutral flame, an oxidizing flame, and a carburizing flame.

14. The brazing operation system of claim 11, wherein the user interface is programmed to: utilize a first identifier and display a first flame type based on the first identifier, utilize a second identifier and display a second flame type based on the second identifier, and utilize a third identifier and display a third flame type based on the third identifier.

15. The brazing operation system of claim 11, wherein the control system is programmed to determine the flame type to be one of a first, a second, or a third flame type based on the gas ratio and the second gas type.

16. The brazing operation system of claim 15, wherein the control system is programmed to: use a first gas ratio range and determine that the flame type is the first flame type, use a second gas ratio range and determine that the flame type is the second flame type, and use a third gas ratio range and determine that the flame type is the third flame type.

17. The brazing operation system of claim 11, wherein the control system is programmed to set the gas ratio to reproduce a targeted and maximized oxidizing flame, a neutral flame, or a carburizing flame.

18. The brazing operation system of claim 11, wherein the control system is programmed to monitor for changes in at least one of a first gas type of the first gas, a second gas type of the second gas, the first pressure, the second pressure, the first micrometer valve setting, the second micrometer valve setting, the first flow rate, the second flow rate, the gas ratio, the flame type, the flame energy value, or the relative temperature of the flame.

19. The brazing operation system of claim 11, wherein the control system is programmed to make adjustments to at least one of the first micrometer valve setting or the second micrometer valve setting until the gas ratio is within an acceptable range.

20. The brazing operation system of claim 11, wherein the first gas is oxygen or air.

* * * * *